(12) United States Patent
Hwang et al.

(10) Patent No.: US 8,176,065 B2
(45) Date of Patent: May 8, 2012

(54) SYSTEM AND METHOD FOR AUTOMATIC SELECTION OF DIGITAL PHOTO ALBUM COVER

(75) Inventors: Paul Jin Hwang, Burbank, CA (US); Rachel They Nguyen, San Jose, CA (US); Guoxuan Zhang, San Diego, CA (US); Jianyu Roy Zheng, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1353 days.

(21) Appl. No.: 11/580,713

(22) Filed: Oct. 13, 2006

(65) Prior Publication Data

US 2008/0147726 A1    Jun. 19, 2008

(51) Int. Cl.
*G06F 17/30* (2006.01)

(52) U.S. Cl. .................. 707/758; 707/E17.02; 707/915; 382/284

(58) Field of Classification Search . 386/4; 707/E17.02
See application file for complete search history.

(56) References Cited

U.S. PATENT DOCUMENTS

| | | | |
|---|---|---|---|
| 6,247,009 B1* | 6/2001 | Shiiyama et al. | 707/3 |
| 6,434,579 B1* | 8/2002 | Shaffer et al. | 715/209 |
| 6,833,848 B1 | 12/2004 | Wolff et al. | |
| 7,171,113 B2* | 1/2007 | Parulski et al. | 396/287 |
| 7,286,723 B2* | 10/2007 | Taugher et al. | 382/305 |
| 7,293,227 B2* | 11/2007 | Plastina et al. | 715/201 |
| 7,328,407 B2* | 2/2008 | MacLaurin | 715/744 |
| 2002/0167683 A1 | 11/2002 | Hanamoto et al. | |
| 2003/0051207 A1* | 3/2003 | Kobayashi et al. | 715/500 |
| 2003/0093790 A1 | 5/2003 | Logan et al. | |
| 2004/0143604 A1* | 7/2004 | Glenner et al. | 707/200 |
| 2004/0174434 A1 | 9/2004 | Walker et al. | |
| 2004/0189694 A1 | 9/2004 | Kurtz et al. | |
| 2004/0205286 A1 | 10/2004 | Bryant et al. | |
| 2005/0105803 A1 | 5/2005 | Ray | |
| 2005/0234983 A1* | 10/2005 | Plastina et al. | 707/104.1 |
| 2006/0004698 A1* | 1/2006 | Pyhalammi et al. | 707/2 |
| 2006/0080269 A1* | 4/2006 | MacLaurin | 706/45 |
| 2006/0157551 A1* | 7/2006 | Kim et al. | 235/375 |
| 2007/0019924 A1* | 1/2007 | Teo et al. | 386/4 |
| 2007/0143714 A1* | 6/2007 | Barbieri | 715/861 |
| 2007/0244984 A1* | 10/2007 | Svendsen | 709/217 |

* cited by examiner

*Primary Examiner* — John E Breene
*Assistant Examiner* — Albert Phillips, III
(74) *Attorney, Agent, or Firm* — John L. Rogitz

(57) ABSTRACT

A photograph in an album of photographs is selected as the cover for the album based on metadata, e.g., most frequently viewed, last viewed, EXIF data, etc.

18 Claims, 2 Drawing Sheets

SYSTEM AND METHOD FOR AUTOMATIC SELECTION OF DIGITAL PHOTO ALBUM COVER

FIELD OF THE INVENTION

The present invention relates generally to establishing album covers for digital photographs.

BACKGROUND OF THE INVENTION

Users can group computer files representing photographs taken by digital cameras into electronically stored albums. The albums may be stored and viewed on a user's computer, and perhaps even printed.

To aid a user in remembering the subject matter of a particular album, a cover photo may be established and displayed on the computer monitor when a user selects the album. As recognized herein, the cover photo ideally represents the subject matter of the album, but as further recognized herein, this ideal is not always realized because either a user is forced to select the cover photo or a photo that may or may not be a good representative of the subject matter of the album is selected at random by a computer program. As recognized herein, it would be desirable to provide a way to relieve a user of having to select an album cover photo while avoiding the random selection of a photo that may not fairly represent the album's subject matter.

SUMMARY OF THE INVENTION

A method for establishing an album cover for a group of digitally stored photographs, with each photograph being associated with a respective computer file, includes accessing metadata for the photographs in the group and based on the metadata, selecting one or more photographs in the group as an album cover for the group.

In some non-limiting implementations the metadata is generated by a camera. In other implementations the metadata is generated by a computer into which the group of photographs has been downloaded.

In any case, at least one photograph can be selected as the album cover based on a time of last viewing, and/or based on a frequency of viewing, and/or based on matching a metadata element associated with the photograph with a user-entered key word, and/or based on satisfying at least one pattern recognition criteria.

In another aspect, a computer program product includes logic that is stored on a computer readable medium to enable a computer to access a group of digitally stored photograph files. The computer can also access metadata of the files and use the metadata to establish an album cover for the group.

In still another aspect, a computer includes means for storing files of digital photographs, each file including respective metadata, and means for selecting one or more photographs as being representative of a user-defined group of photographs, based at least in part on the metadata.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
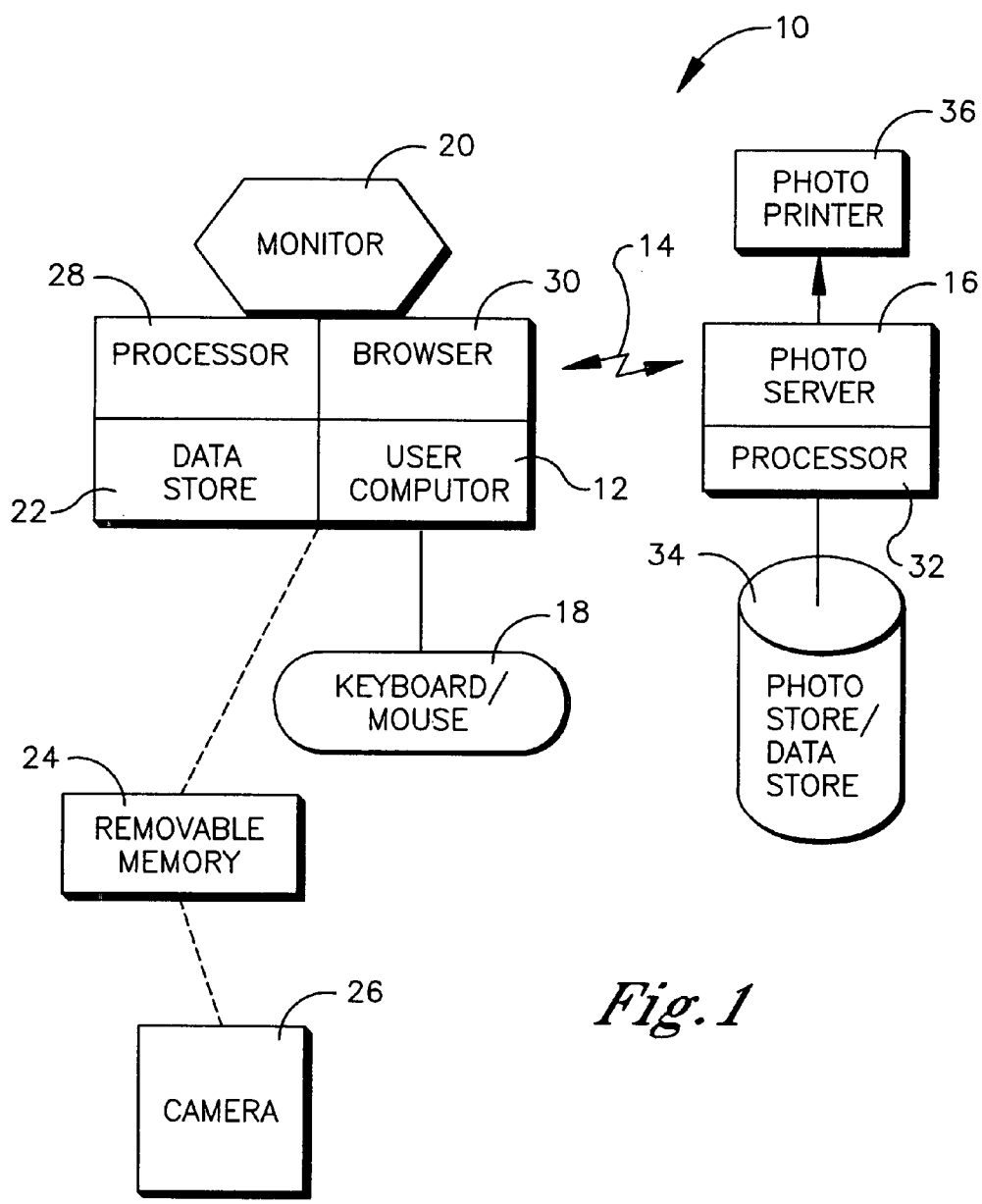
FIG. 1 is a block diagram of a non-limiting system that can be used to implement the invention.

Referring initially to FIG. 1, a system is shown, generally designated 10, that includes a user computer 12, such as but not limited to a personal computer, laptop computer, notebook computer, etc. that communicates over the Internet 14 or other wide area network with a server 16. In typical non-limiting implementations the user computer 12 includes data entry devices 18 such as keyboards, mice, etc. and data output devices such as a monitor 20.

Additionally, the user computer 12 can have a local data store 22 such as but not limited to hard disk drive, optical disk drive, alone or in combination with solid state memory, etc. Digital photographs may be stored in the local data store 22. Also, the computer 12 may be engageable with a removable memory 24 such as but not limited a Sony Memory Stick® that may also bear digital photographs taken by a camera 26 with which the removable memory 24 can be engaged. A user computer processor 28 can execute logic stored in local memory to execute various steps described further below.

The camera 26 typically stores a digital photograph in file form, appending metadata to the file known as "Exchangeable Image File" (EXIF) data. In one non-limiting implementation, the EXIF data may include but may not be limited to file name, camera model name, shooting date/time, shooting mode, photo effect, shutter speed, aperture value, light metering, exposure compensation, ISO speed, lens type, focal length, whether zoom was used, IS mode, image size, image quality, and whether a flash was used and if so what type. Additional metadata that can be appended to a photo file either by the camera 26 or by the processor 28 can include number of times the photo has been viewed, a text description of the photo, comments users may have appended to the photo, rating, most recent date/time of viewing, and most recent date/time of file update.

Completing the description of FIG. 1, the server 16 includes a server processor 32 that can access a server store 34, and the server store 34 can contain photograph files and other data, including user shipping data and billing information. Also, the server 16 can print hard copy prints of digital photographs using a server printer 36, for shipping of the prints to a user of the user computer 12.

Figure 2:
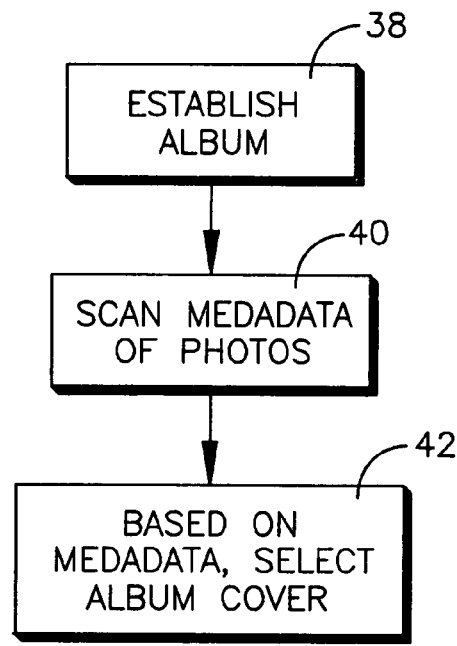
FIG. 2 is a flow chart of non-limiting logic that can be executed by the system shown in FIG. 1.

Now turning to FIG. 2, the present logic can be seen. It is to be understood that prior to undertaking the logic, the photograph files from the camera 26 are downloaded into the user computer 12 by any one of a number of ways. In one non-limiting embodiment the photos are downloaded by copying them from the camera 26 onto the removable memory 24, then removing the memory 24 from the camera 26, engaging it with the computer 12, and then copying the files from the memory 24 onto the data store 22. As another example, the photos can be uploaded from the camera 26 to the server 16 via a wired or wireless Internet link and then downloaded from the server 16 to the user computer 12.

Commencing at block 38, the user establishes an album typically by grouping the files of related photographs. For instance, the user might group together photos from a vacation, or an event such as a birthday.

At block 40, the processor 28 scans the metadata of each photo file. Moving to block 42, one or more of the photos in the album is selected as an album cover automatically by the processor 28 based on the metadata.

Figure 3:
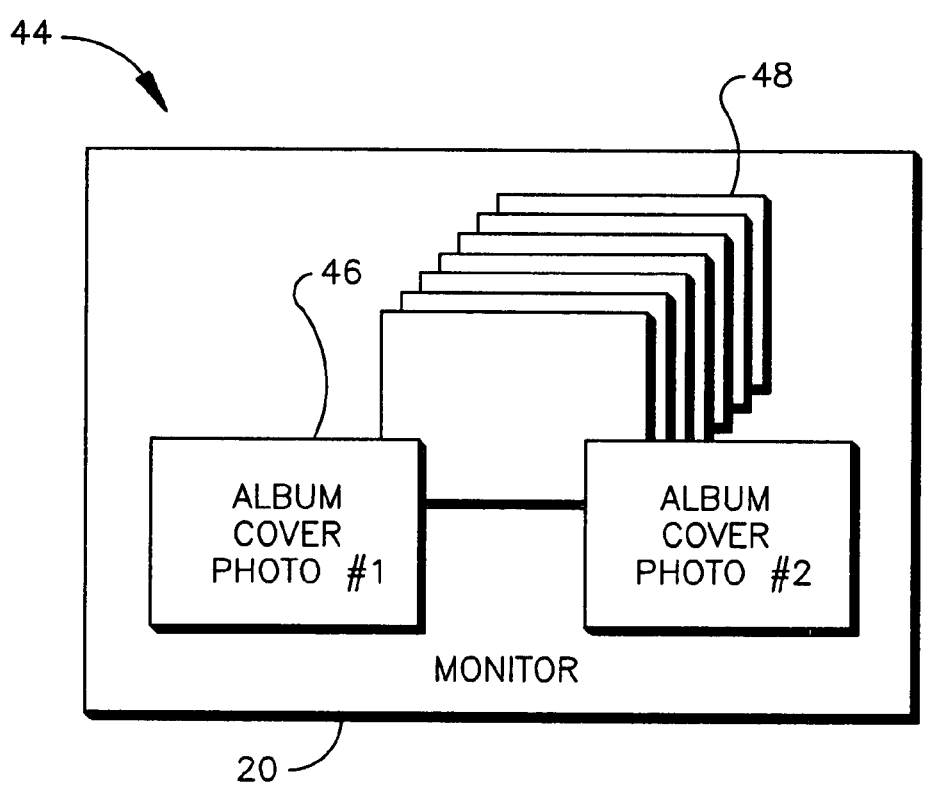
FIG. 3 is a non-limiting screen shot of an album cover that can be produced by the present invention.

FIG. 3 shows a screen shot 44 that can be presented on the monitor 20 to illustrate that an album cover 46 consisting of one or more photos 48 from an album can be displayed when a user selects the album. For illustration, FIG. 3 shows that two cover photos can be presented as an album cover.

In one implementation, the "N" most recently viewed photos are selected as the album cover, wherein "N" is an integer greater than zero. In another implementation, the "N" photos whose files were most recently updated are selected as the album cover, wherein "N" is an integer greater than zero. In yet another implementation, a user can enter a key word or words and the photo or photos whose metadata includes that key word or words in the comments or elsewhere in the metadata are selected as the album cover. In still another implementation, the "N" most frequently viewed photos are selected as the album cover, wherein "N" is an integer greater than zero. In another implementation, the photo or photos satisfying a specified EXIF parameter or parameters (e.g., "zoom used") are selected as the album cover. In other implementations a combination of the above heuristics can be used. In the event that the computer 12 possesses pattern recognition capability and can append information in the metadata pertaining thereto to photo files, a photo or photos can be selected based on pattern recognition, e.g., the photo or photos showing the most commonly photographed person in the album can be selected as the cover.

While the particular SYSTEM AND METHOD FOR AUTOMATIC SELECTION OF DIGITAL PHOTO ALBUM COVER is herein shown and described in detail, it is to be understood that the subject matter which is encompassed by the present invention is limited only by the claims.

What is claimed is:

1. A method for establishing an album cover for a group of digitally stored photographs each being associated with a respective computer file, comprising:
    accessing metadata for at least some photographs in the group; and
    based at least in part on the metadata, selecting one or more photographs in the group as an album cover for the group, wherein at least one photograph is selected as the album cover based on a time of last viewing.

2. The method of claim 1, wherein the metadata is generated by a camera.

3. The method of claim 1, wherein the metadata is generated by a computer into which the group of photographs has been downloaded.

4. The method of claim 1, wherein at least one photograph is selected as the album cover based on a frequency of viewing.

5. The method of claim 1, wherein at least one photograph is selected as the album cover based on a recency of file update.

6. The method of claim 1, wherein at least one photograph is selected as the album cover based on matching a metadata element associated with the photograph with a user-entered key word.

7. The method of claim 1, wherein at least one photograph is selected as the album cover based on satisfying at least two metadata criteria.

8. The method of claim 1, wherein at least one photograph is selected as the album cover based on satisfying at least one pattern recognition criteria.

9. A computer program product including logic stored on a computer readable medium to enable a computer to:
    access a group of digitally stored photograph files;
    access metadata of the files; and
    use the metadata to establish an album cover for the group, wherein at least one photograph is selected as the album cover based on a recency of file update.

10. The computer program product of claim 9, wherein the metadata is generated by a camera.

11. The computer program product of claim 9, wherein the metadata is generated by the computer, the group of photographs having been downloaded thereto.

12. The computer program product of claim 9, wherein at least one photograph is selected as the album cover based on a time of last viewing.

13. The computer program product of claim 9, wherein at least one photograph is selected as the album cover based on a frequency of viewing.

14. The computer program product of claim 9, wherein at least one photograph is selected as the album cover based on matching a metadata element associated with the photograph with a user-entered key word.

15. The computer program product of claim 9, wherein at least one photograph is selected as the album cover based on satisfying at least two metadata criteria.

16. The computer program product of claim 9, wherein at least one photograph is selected as the album cover based on satisfying at least one pattern recognition criteria.

17. A computer, comprising:
    means for storing files of digital photographs, each file including respective metadata; and
    means for selecting one and only one photograph as being representative of a user-defined group of photographs, based at least in part on a frequency of viewing as indicated by the metadata.

18. The computer of claim 17, wherein the photograph is selected as being representative of the user-defined group of photographs based on a time of last viewing and/or a recency of file update.

* * * * *